(12) United States Patent
Erdmann et al.

(10) Patent No.: US 9,047,185 B2
(45) Date of Patent: Jun. 2, 2015

(54) INADVERTENT FREED STORAGE RECOVERY

(75) Inventors: Derek L. Erdmann, Tucson, AZ (US); Dustin A. Helak, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 13/547,659

(22) Filed: Jul. 12, 2012

(65) Prior Publication Data

US 2014/0019800 A1 Jan. 16, 2014

(51) Int. Cl.
G06F 11/00 (2006.01)
G06F 11/07 (2006.01)
G06F 11/14 (2006.01)

(52) U.S. Cl.
CPC ........ *G06F 11/0727* (2013.01); *G06F 11/0778* (2013.01); *G06F 11/0793* (2013.01); *G06F 11/1415* (2013.01)

(58) Field of Classification Search
None
See application file for complete search history.

(56) References Cited

U.S. PATENT DOCUMENTS

| 7,051,056 B2 * | 5/2006 | Rodriguez-Rivera et al. ........ 1/1 |
| 7,299,384 B1 * | 11/2007 | Rodriguez-Rivera et al. .. 714/52 |
| 7,434,105 B1 * | 10/2008 | Rodriguez-Rivera et al. ............... 714/38.1 |
| 7,702,959 B2 * | 4/2010 | Hwang et al. .............. 714/38.11 |
| 2004/0139272 A1 * | 7/2004 | Rodriguez-Rivera et al. ............... 711/100 |
| 2007/0033281 A1 * | 2/2007 | Hwang et al. ................. 709/224 |
| 2009/0172337 A1 | 7/2009 | Van Riel et al. |
| 2010/0180156 A1 | 7/2010 | Aranguren et al. |
| 2011/0307745 A1 | 12/2011 | McCune et al. |
| 2012/0005449 A1 | 1/2012 | Reed et al. |

* cited by examiner

*Primary Examiner* — Christopher McCarthy
(74) *Attorney, Agent, or Firm* — Terrile, Cannatti, Chambers & Holland, LLP; Stephen A. Terrile

(57) ABSTRACT

An abnormal termination recovery is performed where storage is referenced shortly after the storage has been freed. More specifically, when storage is freed, and that storage is accessed, an abnormal termination error (e.g., a page translation exception event) occurs due to referencing storage that has not been obtained. When the abnormal termination error occurs, an abnormal termination recovery operation is accessed. The abnormal termination recovery operation scans a history of storage freeing operations (e.g., FREEMAIN operations) to determine whether the storage location accessed by the storage access that caused the abnormal termination error was recently freed from within the same address space. If the storage location was recently freed, then the abnormal termination recovery operation reverses the storage freeing operation by issuing a storage obtaining operation (e.g., a GETMAIN operation) to re-obtain the storage.

18 Claims, 3 Drawing Sheets

US 9,047,185 B2

INADVERTENT FREED STORAGE RECOVERY

BACKGROUND OF THE INVENTION

1. Field of the Invention

The present invention relates in general to the field of computer operations and, more particularly to recovery of inadvertently freed storage.

2. Description of the Related Art

It is known to control storage systems using powerful host computer systems such as mainframe type computer systems. These host systems execute operating systems such as the z/OS operating system available from IBM. The z/OS operating system is well suited for continuation, high volume operation with high security and stability.

One error encountered on operating systems such as the z/OS operating system is an abnormal termination error (also sometimes referred to as ABEND for abnormal end). One cause of an abnormal termination error is due to accessing storage that has been freed. Accessing of storage that has been freed is generally due to programming errors; users may have no circumvention for these errors until a fix is provided. Providing a fix can take an extended period depending on the scope of a fix and the testing required. If the abnormal termination errors cause an application outage or worse a system outage, the impact can be quite severe.

SUMMARY OF THE INVENTION

In accordance with the present invention, a method, system and computer readable medium are provided with enable abnormal termination recovery. More specifically, the abnormal termination recovery covers a condition where storage is referenced shortly after the storage has been freed. More specifically, when storage is freed, and that storage is accessed, an abnormal termination error (e.g., a page translation exception event) occurs due to referencing storage that has not been obtained. When the abnormal termination error occurs, an abnormal termination recovery operation is accessed. The abnormal termination recovery operation scans a history of storage freeing operations (e.g., FREEMAIN operations) to determine whether the storage location accessed by the storage access that caused the abnormal termination error was recently freed or originally obtained from within the same address space. If the storage location was recently freed or originally obtained, then the abnormal termination recovery operation reverses the storage freeing operation by issuing a storage obtaining operation (e.g., a GETMAIN operation) to re-obtain the storage. The abnormal termination recovery operation then allows the program that referenced the recently freed or originally obtained storage to access the storage and to continue execution. Also, in certain embodiments, the abnormal termination recovery operation further includes provision to all dump processing to capture information relating to the abnormal termination error, so the error is surfaced and diagnostic work can be taken to permanently correct the error. However, rather than job termination and other job cleanup, by providing the abnormal termination recovery operation, the job is allowed to continue processing as if the error did not take place. The re-obtained storage, is then freed when the job eventually ends.

Additionally, in various embodiments, the invention relates to a method, system and computer readable medium for recovering from an abnormal termination error condition which include detecting when an abnormal termination error condition has occurred; determining whether the abnormal termination error condition was due to a program referencing storage that has not been obtained; determining whether the storage that has not been obtained was recently freed storage; and, reobtaining the recently freed storage when the storage that has not been obtained is recently freed storage.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
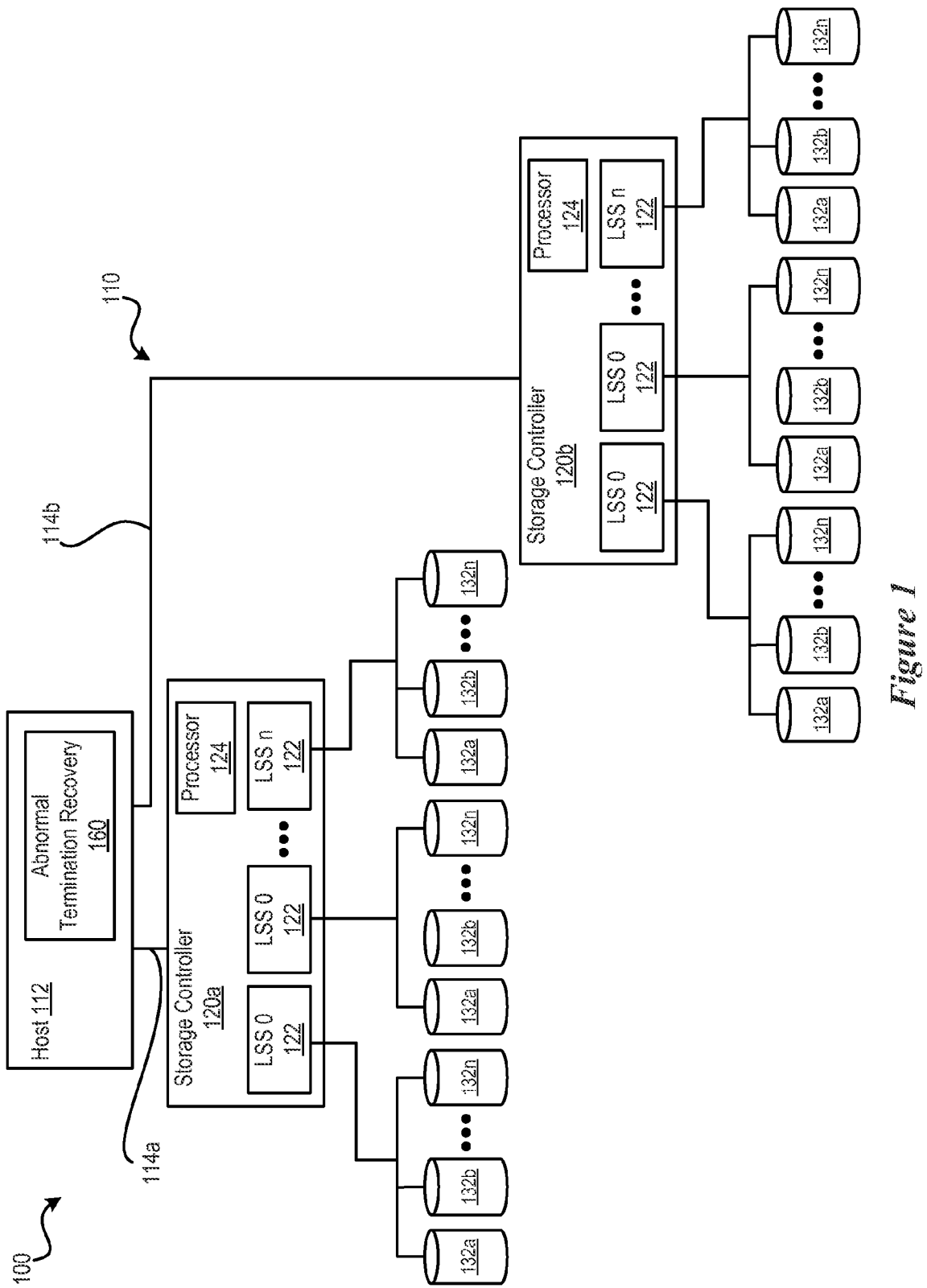
FIG. 1 is a block diagram showing a host computer in communication with a data storage system.

Many of the functional units described in this specification have been labeled as modules, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, among different processors, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of causing execution of a program of machine-readable instructions on a digital processing apparatus. A computer readable medium may be embodied by a compact disk, digital-video disk, a magnetic tape, a Bernoulli drive, a magnetic disk, holographic disk or tape, a punch card, flash memory, magnetoresistive memory, integrated circuits, or other digital processing apparatus memory device.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Referring now to FIG. 1, a data processing system 100 comprises data storage system 110 and one or more host computers 112 (also referred to as hosts). The storage system 110 is in communication with host computer 112 via communication paths 114a, 114b. Communication paths 114a, 114b each comprise a communication link, where that communication link can be configured to comprise up to 256 logical pathways. The illustrated embodiment shows a single host computer. In other embodiments, data storage system 110 may be in communication with a plurality of host computers.

Although the system is described in terms of a storage control unit or "controller" and logical storage subsystems (LSS), the system may be implemented with other devices as well. The storage system 110 includes a storage system such as those available from International Business Machines under the trade designation IBM DS6000 or DS8000. In certain embodiments, the storage system 110 includes two storage controllers 120a and 120b, storage devices 122, such as hard disk drivers (HDDs). In certain embodiments, the storage system can further include an interface, such as an IBM Enterprise Storage Server Network Interface (ESSNI) or other interface.

The host 112 is coupled to the storage controller via appropriate connections through which commands, queries, response and other information are exchanged. The storage controller 120 may be configured with one or more logical storage subsystems (LSSs) 132 (e.g., LSS 0, LSS 1, . . . LSS n). Each LSS is assigned one or more storage devices 132.

The host computer 112 includes provision for execution of an abnormal termination recovery module 160. The abnormal termination recover module 160 enables a host 112 to provide abnormal termination recovery where storage is referenced shortly after the storage has been freed. More specifically, when storage is freed, and that storage is accessed, an abnormal termination error (e.g., a page translation exception event) occurs due to referencing storage that has not been obtained. When the abnormal termination error occurs, the abnormal termination recovery module 160 executes and an abnormal termination recovery operation is accessed. The abnormal termination recovery operation scans a history of storage freeing operations (e.g., FREEMAIN operations) to determine whether the storage location accessed by the storage access that caused the abnormal termination error was recently freed or originally obtained from within the same address space. If the storage location was recently freed or originally obtained, then the abnormal termination recovery operation reverses the storage freeing operation by issuing a storage obtaining operation (e.g., a GETMAIN operation) to re-obtain the storage. The abnormal termination recovery operation then allows the program that referenced the recently freed or originally obtained storage to access the storage and to continue execution. Also, in certain embodiments, the abnormal termination recovery operation further includes provision to all dump processing to capture information relating to the abnormal termination error, so the error is surfaced and diagnostic work can be taken to permanently correct the error. However, rather than job termination and other job cleanup, by providing the abnormal termination recovery operation, the job is allowed to continue processing as if the error did not take place. The re-obtained storage, is then freed when the job eventually ends.

Figure 2:
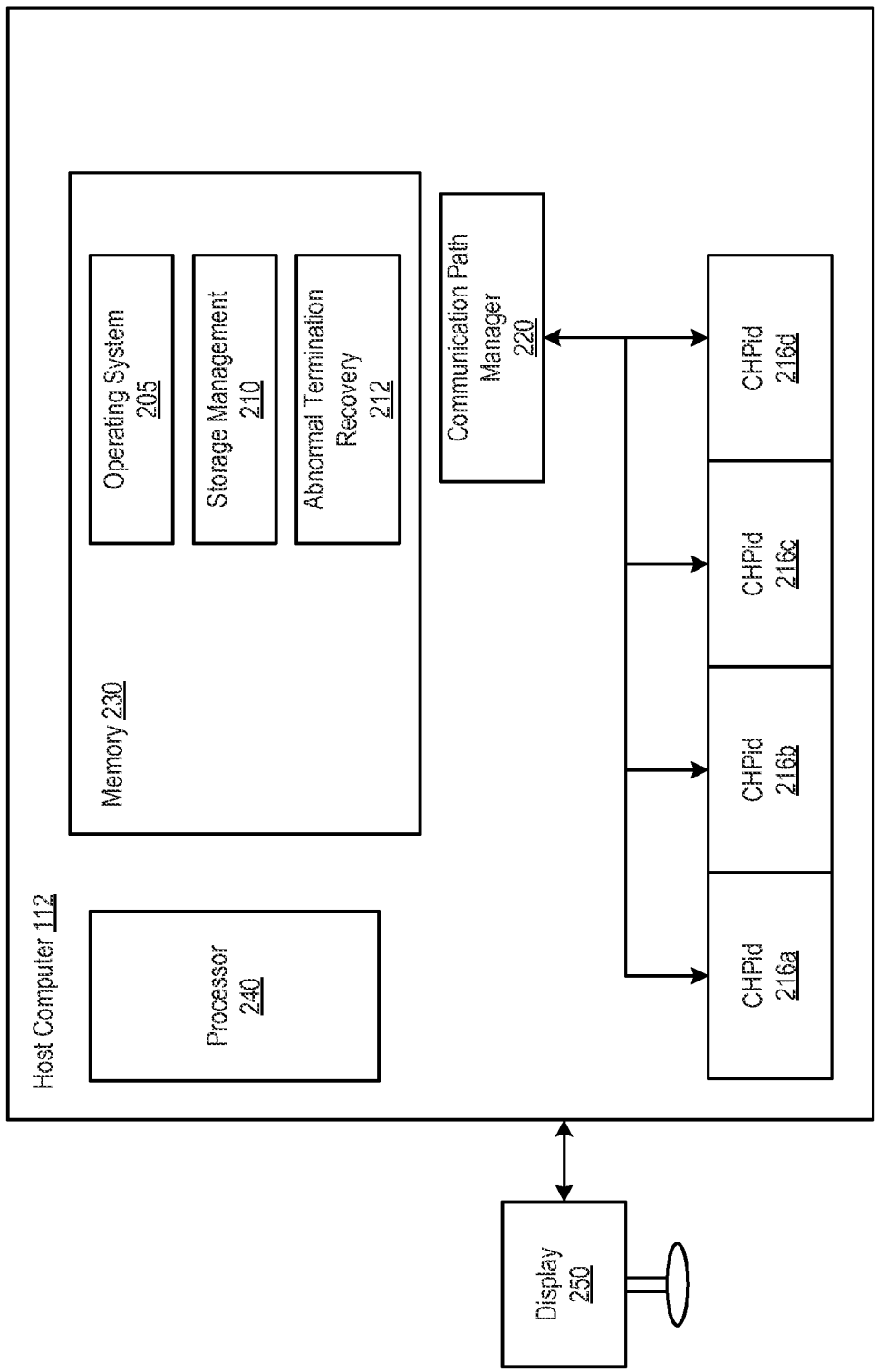
FIG. 2 is a block diagram showing a host computer communication path manager.

Referring to FIG. 2, the host computer 112 comprises a computer system, such as a mainframe, personal computer, workstation, and combinations thereof, including an operating system 205 such as z/OS, Windows, AIX, Unix, MVS, LINUX, etc. (Windows is a registered trademark of Microsoft Corporation; z/OS and AIX are registered trademarks and MVS is a trademark of IBM Corporation; and UNIX is a registered trademark in the United States and other countries licensed exclusively through The Open Group.) The host computer 112 can further include a storage management program 210. The storage management program in the host computer 112. may include the functionality of storage management type programs known in the art that manage the transfer of data to a data storage and retrieval system, such as the IBM DFSMS implemented in the IBM MVS operating system.

The host computer 112 can also comprise a plurality of channel path identifiers ("CHPids") CHPids 216a, 216b, 216c, 216d). CHPids 216a, 216b, 216c, 216d, are physically interconnected to respective host adapters within the storage controller 120. The host computer 112 further comprises a communication path manager 220, where the communication path manager 220 is in communication with each of CHPids 216. In certain embodiments, the communication path manager 220 configures each of communication paths, to comprise up to 256 logical communication pathways.

The host computer 112 further comprises a memory 230 (e.g., a computer readable medium). The operating system 205 and the storage management program 210, are stored on the memory 230. The operating system 205 and the storage management program 210 include instructions which may be loaded on and executed by a processor 240. The host computer 112 may be interconnected with display device 250. The display device 250 may be integral with host computer 112 or may be remote from host computer 112. For example, the display device 250 may be located in a system administrator's office.

Figure 3:
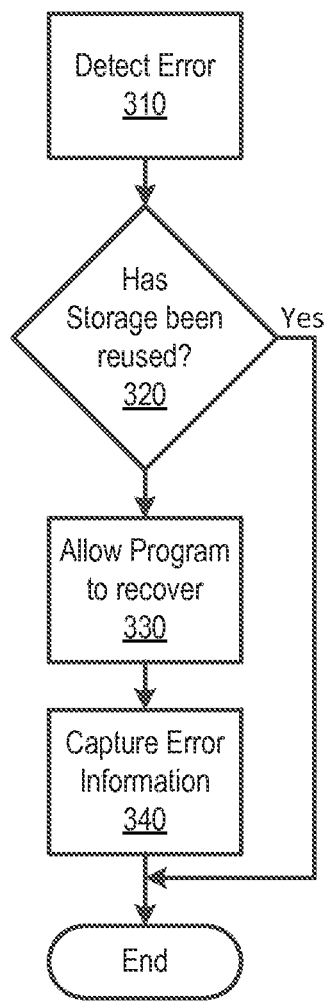
FIG. 3 shows a flow chart of the operation of an abnormal termination recovery operation.

Referring to FIG. 3, a flow chart of an abnormal termination recovery operation 300 is shown. More specifically, the abnormal termination recovery operation 300 monitors the data processing system 100 fur abnormal termination errors such as page translation exceptions. In various embodiments, the abnormal termination recovery operation is provided by a program (e.g., abnormal termination recovery module 212) which is external to the operating system 205 or is incorporated into the operating system 205. When the abnormal termination recovery module 212 is external to the operating system 205, the abnormal termination recovery module intercepts the abnormal termination errors before the errors cause the operating system to generate an abnormal termination.

In certain embodiments, a plurality of conditions can cause an abnormal termination error. For example, when a program references storage that has not been obtained this condition can cause an abnormal termination error. Other causes of an abnormal termination error can be from running disabled referencing paged out storage or running in a subspace and referencing unavailable storage. Both of these causes are ignored by the abnormal termination error recovery operation and will continue to generate an abnormal termination error condition such as the ABEND0C4 condition.

When an abnormal termination error is detected at step 310, the abnormal termination recovery operation 300 determines whether this error is a condition from which recovery can be made. To recover from the abnormal termination error, the abnormal termination recovery operation checks a plurality of conditions to determine whether the storage is still usable. More specifically, at step 320 the abnormal termination recovery operation determines whether the storage has been reused by another program since the storage was freed. In certain embodiments, the abnormal termination recovery operation reviews a system trace table to determine whether the storage has been reused. The system trace table contains a brief history of events such as get memory operations and free memory operations (e.g., GETMAINs and FREEMAINs, respectively) on the system. The abnormal termination recovery operation scans the system trace table to determine when the storage was last released. If the abnormal termination recovery operation does not detect a free storage operation (such as a FREEMAIN operation) that released the storage, the abnormal termination recovery operation cannot confirm this job was the last job to use this storage so the abnormal termination recovery operation does not recover the storage.

If the abnormal termination recovery operation 300 does detect the most recent e memory operation was from this same job that caused the abnormal termination error, then the abnormal termination recovery operation 300 determines the size of the storage that was freed. Next, the abnormal termination recovery operation 300 scans forward from the starting point of the most recent free memory operation to confirm that available storage was not obtained in a later get memory operation. If no other get memory operations reference this storage, the abnormal termination recovery operation 300 determines that the contents of this storage have not changed since the last free memory operation. Because with common storage any program can get or free storage in a common pool, it is important to confirm from which address space the get memory operation or the free memory operation originated.

Next, if the storage did not change since the last free memory operation, then the abnormal termination recovery operation 300 issues a new get memory operation for the amount of storage released by the previous free memory operation. In certain embodiments, Register 1 on a get memory operation such as a GETMAIN request is not used, but is used to provide the address Obtained during return. Thus, the abnormal termination recovery operation 300 uses Register 1 to specify the starting address of the area that the abnormal termination recovery operation 300 is trying to obtain. Register 0 of the get memory operation holds the number of bytes requested. Using Register 1 and Register 0 in this way, the abnormal termination recovery operation 300 can confirm the same storage area has been re-obtained. Next, at step 330, if the addresses match what was freed, then the abnormal termination recovery operation 300 allows the program to continue and access the storage.

In certain embodiments, because an abnormal termination error was generated, at step 340 the abnormal termination recovery operation 300 captures error information (similar that what would be captured from an abnormal termination operation such as an ABEND0C4 operation). The abnormal termination recovery operation 300 also associates a condition code with the error information to indicate that the storage was recovered. The storage is then retained until the program issues another free memory operation for that storage area or the storage is released during job termination. The abnormal termination recovery operation 300 maintains a list of the storage areas that have been recovered along with the address spaces of the programs that own the storage areas. When the address spaces terminate, the abnormal termination recovery operation 300 frees any storage that has been recovered from within the common storage area. In this way, the abnormal termination recovery operation 300 frees common storage which would otherwise not be automatically freed during job termination (as compared with private storage).

Although the present invention has been described in detail, it should be understood that various changes, substitutions and alterations can he made hereto without departing from the spirit and scope of the invention as defined by the appended claims.

What is claimed is:

1. A method for recovering from an abnormal termination error condition, the method comprising:
   detecting when an abnormal termination error condition has occurred;
   determining whether the abnormal termination error condition was due to a program referencing storage that has not been obtained;
   determining whether the storage that has not been obtained was recently freed storage; and,
   reobtaining the recently freed storage when the storage that has not been obtained is recently freed storage; and wherein
   the determining whether the storage that has not been obtained was recently freed comprises scanning a history of storage freeing operations; and,
   the abnormal termination error comprises a page translation exception event.

2. The method of claim 1, wherein
   the determining whether the storage that has not been obtained was recently freed by scanning a history of storage freeing operations determines whether the storage location accessed by the storage access that caused the abnormal termination error was recently freed from within the same address space.

3. The method of claim 2, wherein
   the storage freeing operations correspond to FREEMAIN operations.

4. The method of claim 1, further comprising
   allowing the program referring storage that has not been obtained to access the storage and to continue execution.

5. The method of claim 1, further comprising
   allowing dump processing to capture information relating to the abnormal termination error, so the error is surfaced and diagnostic work can be taken to permanently correct the error.

6. The method of claim 1, wherein
   the abnormal termination error corresponds to an ABEND operation.

7. A system comprising:
   a processor;
   a data bus coupled to the processor; and
   a computer-usable medium embodying computer program code, the computer-usable medium being coupled to the data bus, the computer program code comprising instructions executable by the processor and configured for:

detecting when an abnormal termination error condition has occurred;

determining whether the abnormal termination error condition was due to a program referencing storage that has not been obtained;

determining whether the storage that has not been obtained was recently freed storage; and, reobtaining the recently freed storage when the storage that has not been obtained is recently freed storage; and wherein the determining whether the storage that has not been obtained was recently freed comprises scanning a history of storage freeing operations; and, the abnormal termination error comprises a page translation exception event.

8. The system of claim 7, wherein
the determining whether the storage that has not been obtained was recently freed by scanning a history of storage freeing operations determines whether the storage location accessed by the storage access that caused the abnormal termination error was recently freed from within the same address space.

9. The system of claim 8, wherein
the storage freeing operations correspond to FREEMAIN operations.

10. The system of claim 7, wherein the computer program code further comprises instructions executable by the processor and configured for
allowing the program referring storage that has not been obtained to access the storage and to continue execution.

11. The system of claim 7, wherein the computer program code further comprises instructions executable by the processor and configured for:
allowing dump processing to capture information relating to the abnormal termination error, so the error is surfaced and diagnostic work can be taken to permanently correct the error.

12. The system of claim 11, wherein
the abnormal termination error corresponds to an ABEND operation.

13. A non-transitory computer-usable medium embodying computer program code, the computer program code comprising computer executable instructions configured for:

detecting when an abnormal termination error condition has occurred;

determining whether the abnormal termination error condition was due to a program referencing storage that has not been obtained;

determining whether the storage that has not been obtained was recently freed storage; and, reobtaining the recently freed storage when the storage that has not been obtained is recently freed storage; and wherein the determining whether the storage that has not been obtained was recently freed comprises scanning a history of storage freeing operations; and, the abnormal termination error comprises a page translation exception event.

14. The computer-usable medium of claim 13, wherein
the determining whether the storage that has not been obtained was recently freed by scanning a history of storage freeing operations determines whether the storage location accessed by the storage access that caused the abnormal termination error was recently freed from within the same address space.

15. The computer-usable medium of claim 14, wherein
the storage freeing operations correspond to FREEMAIN operations.

16. The computer-usable medium of claim 15, wherein the computer program code further comprises instructions executable by the processor and configured for:
allowing the program referring storage that has not been obtained to access the storage and to continue execution.

17. The computer-usable medium of claim 13, wherein the computer program code further comprises instructions executable by the processor and configured for:
allowing dump processing to capture information relating to the abnormal termination error, so the error is surfaced and diagnostic work can be taken to permanently correct the error.

18. The computer-usable medium of claim 17, wherein
the abnormal termination error corresponds to an ABEND operation.

* * * * *